United States Patent [19]
West

[11] 3,716,201
[45] Feb. 13, 1973

[54] COILABLE RULE AND REPLACEMENT CARTRIDGE THEREFOR

[75] Inventor: Robert F. West, New Britain, Conn.

[73] Assignee: The Stanley Works, New Britain, Conn.

[22] Filed: May 4, 1970

[21] Appl. No.: 34,080

[52] U.S. Cl. .................. 242/107, 33/138, 242/107.3
[51] Int. Cl. ............................................... B65h 75/48
[58] Field of Search ..33/138; 242/84.8, 107, 107.11, 242/107.12, 107.2, 107.3, 107.6

[56] References Cited

UNITED STATES PATENTS

| | | |
|---|---|---|
| 2,632,609 | 3/1953 | Kirby.................................242/107.6 |
| 3,482,798 | 12/1969 | Kawaguchi........................242/107.3 |
| 3,216,117 | 11/1965 | Stowell................................33/138 |
| 3,214,836 | 11/1965 | West.....................................33/138 |
| 3,318,550 | 5/1967 | Quenot.............................242/107.3 |
| 2,616,635 | 11/1952 | Carlson.............................242/107.2 |
| 3,041,004 | 6/1962 | Busch................................242/107.3 |
| 3,211,496 | 10/1965 | Zaydel..............................242/107.12 |

*Primary Examiner*—Stanley N. Gilreath
*Attorney*—Prutzman, Hayes, Kalb & Chilton

[57] ABSTRACT

A coilable rule is provided with a casing and a self sustaining replacement cartridge comprising a spool member rotatably mounted on a separate hub which has recesses in its end for non-rotatable engagement with truncated studs in the casing, a coiled blade, and a recoil spring attached to the blade and the hub. The spring tension is factory adjusted and maintained until assembled in the casing by a keeper.

8 Claims, 3 Drawing Figures

PATENTED FEB 13 1973　　3,716,201

INVENTOR
ROBERT F. WEST

BY Prutzman, Hayes, Kalb and Chilton

ATTORNEYS

COILABLE RULE AND REPLACEMENT CARTRIDGE THEREFOR

This invention generally relates to coilable rules and more particularly to an improvement in a coilable rule of the type shown and claimed in U.S. Pat. No. 3,216,117 issued Nov. 9, 1965 and assigned to the assignee of the present invention.

One of the objects of the present invention is to provide an improved coilable rule of a free hub design.

Another object of this invention is to provide a replacement cartridge for a coilable rule wherein the coilable measuring blade and the recoil spring are factory preassembled on the hub in a pretensioned state so that they may be field assembled in the casing in proper adjustment without the use of special tools or assembly techniques.

Other objects will be in part obvious and in part pointed out more in detail hereinafter.

The invention accordingly consists in the features of construction, combination of elements and arrangement of parts which will be exemplified in the construction hereafter set forth.

Figure 1:
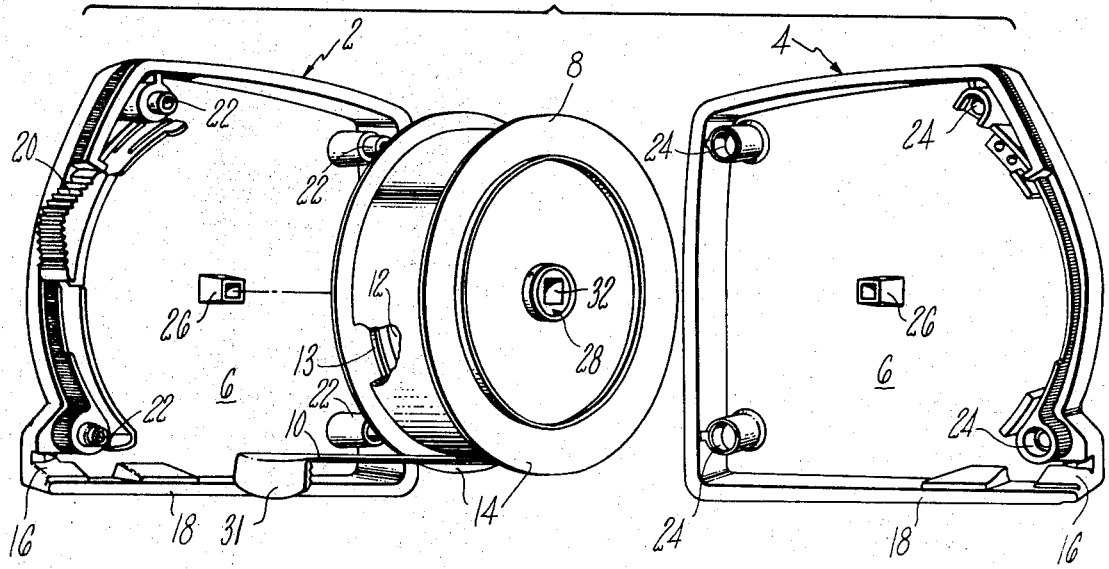
FIG. 1 is an exploded view, partly broken away, of a coilable rule constructed in accordance with the present invention.

Referring to the drawing in detail, FIG. 1 illustrates a coilable rule embodying the present invention comprising a pair of mating casing halves 2 and 4 which are joined together to define a chamber 6 for receiving a spool 8. A coilable measuring blade 10 and a recoil spring 12 are mounted on spool 8 with the coiled measuring blade 10 being supported in coiled position on annularly disposed surfaces 13 provided by the side discs 14 of the spool 8 and the recoil spring supported between the side discs 14 radially inwardly of the coiled measuring blade 10 as typically illustrated in the aforesaid U.S. Pat. No. 3,216,117. The casing is provided with a mouth 16 adjacent the bottom wall 18 through which the measuring blade 10 passes when the latter is extended and retracted.

As shown, the coilable rule is provided with a manually operated brake member 20 to lock the tape blade 10 in adjusted extended position as more fully disclosed and claimed in my U.S. Pat. No. 3,214,836.

The casing halves 2, 4 are generally mirror images of each other with casing half 2 being provided with hollow posts 22 which are received in mating sockets 24 provided in casing half 4. Fasteners such as screws may be passed through the sockets 24 and threaded into the posts 22 to hold the casing together.

According to one aspect of this invention, the inner end of the recoil spring 12 is anchored to a free hub 28 by being inserted in a nonradial slot 30 in the hub. The ends of free hub 28 which may be formed of a suitable molded plastic, are provided with apertures 32 of noncircular or square cross section which receive the mating truncated studs 26 respectively provided on casing halves 2, 4 to hold the hub against rotation while permitting it to be readily removed for replacement.

The inner end of the measuring blade 10 is connected to the outer end of recoil spring 12 in any suitable manner so as to automatically be retracted into coiled position in the chamber under the bias of the recoil spring when the measuring blade is released from any of its extended positions. The free end of the measuring blade is provided with a suitable hook 31, as shown in FIG. 1, to maintain the free end of the blade accessible at the mouth of the casing when the measuring blade 10 is retracted into the casing.

In measuring tapes of the general type described, the measuring blade 10, or the recoil spring 12, is sometimes damaged in use requiring replacement. In the past, such replacement has required special assembly skill or a trial and error procedure to adjust the recoil spring 12 to a proper level of tension for satisfactory performance. Because of the difficulties in replacing the blade and achieving the proper tension level, the entire rule is frequently discarded in favor of a new coilable rule rather than repaired.

Figure 2:
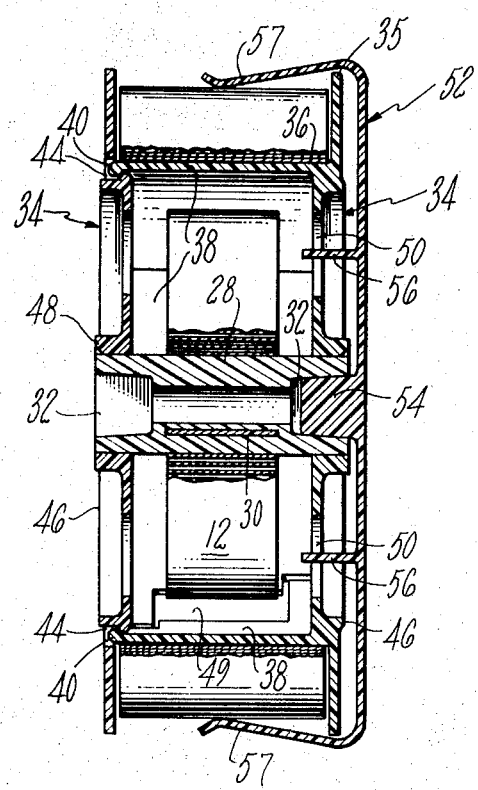
FIG. 2 is an enlarged cross-sectional view of a replacement cartridge incorporating the invention including a keeper for maintaining the integrity of the replaceable cartridge before installation.
Figure 3:
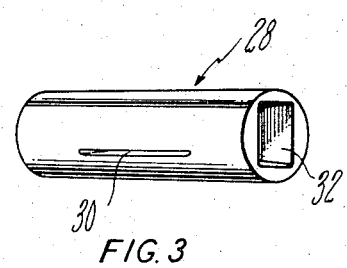
FIG. 3 is an enlarged perspective view of the free hub construction forming part of the invention.

The present invention provides a novel construction which makes it possible to replace a damaged blade by installing a factory assembled replacement cartridge which can be readily accomplished without special tools or skills. As shown in FIG. 2, such a replacement cartridge includes a spool assembly having a spool and a free hub 28 to which the inner end of the recoil spring 12 is secured with the recoil spring being factory adjusted to a precisely fixed level of tension so that the repaired rule will operate with the same level of performance as a new rule.

In the replacement cartridge of FIG. 2, the spool comprises a self-sustaining construction to maintain its assembled relationship during shipment and installation. As illustrated, the spool is formed of a pair of molded plastic identical disc members 34 providing peripheral shoulders 36 for supporting the innermost coil of the measuring blade 10 when it is in its coiled position. The shoulders 36 of each of the disc members 34 are extended laterally to provide a pair of circumferentially spaced arcuate flanges 38 disposed 180° apart. The two disc members 34 are assembled with the flanges 38 thereof being interdigitated and the beaded ends 40 thereof snap-fitted into mating slots 44 provided in the opposite disc member 34.

The outer side of each of the discs is provided with an annular rib 46 which engages the inner surface of the casing halves 2 and 4 to provide a bearing surface of uniform limited frictional resistance for smooth operation of the rule. Each of the discs is provided with a central annular flange 48 which is journalled on the free hub 28 as shown in FIG. 2 and with pairs of apertures 50 for purposes hereinafter more fully described.

The cavity between the discs radially inwardly from the flanges 38 provides a chamber for recoil spring 12 and the flanges are circumferentially spaced as at 49 so that the outer end of the recoil spring may pass therethrough and be connected to the inner end of the measuring blade 10.

With the replacement cartridge of FIG. 2 assembled in the factory with the recoil spring 12 adjusted to the desired tension and the measuring blade 10 coiled about the flanges 38, a keeper 52 is applied as indicated in FIG. 2. The keeper may be formed of sheet metal or molded from a suitable plastic material. The keeper 52 is provided with a noncircular projection 54 which is nonrotatably received in an end of free hub 28 and is also provided with one or more inwardly projecting legs 56 which are received in the apertures 50 of a disc member 34 to thereby prevent relative rotation of the free hub with respect to the spool during shipment and assembly in the rule as a replacement unit. The keeper 52 is also shown as being provided with a pair of resilient outer arms 57 which snap over the outer edge 35 of one of the discs 34 to secure the keeper on the spool and overlie the coiled measuring blade 10 to prevent it from unwinding during shipment and assembly.

With the assembly shown in FIG. 2, all that is required to replace the blade is to disassemble the casing halves 2, 4, remove the old spool together with the measuring blade 10, the coiled spring 12 and the free hub 28, insert the replacement cartridge of FIG. 2 with the end of the measuring blade 10 projecting through the mouth 16 of the casing and the hub of the cartridge engaged with the truncated stud 26 of the appropriate casing half. When so assembled, the keeper 52 may be removed, the other casing half assembled over the replacement cartridge and the fasteners reinstalled to maintain the casing halves together.

It will be apparent that the replacement cartridge may be installed without loss of the proper factory adjusted tension of the recoil spring 12 so that the tape with the repaired rule performs with the quality of a new rule.

From the foregoing it will be readily apparent that the present invention provides an improved coilable rule having a free hub construction and further provides for the repair of the rule with a replacement cartridge factory adjusted to provide new rule performance in a repaired rule.

As will be apparent to persons skilled in the art, various modifications, adaptations and variations of the foregoing specific disclosure can be made without departing from the teachings of the present invention.

I claim:

1. A replacement cartridge for a coilable rule comprising a form-sustaining spool mounting a coiled measuring blade, said spool having a centrally disposed aperture, a removable hub received within said aperture, a recoil spring having one end secured to said hub and the other end secured to the inner end of said measuring blade, and a keeper for maintaining the measuring blade, the recoil spring and the hub in fixed relation relative to each other and to the spool, and means for securing said keeper against rotation relative to said spool.

2. The replacement cartridge of claim 1 wherein a ledge extends between the side walls of the spool, said ledge mounting the coiled measuring blade thereon.

3. The replacement cartridge of claim 1 wherein said keeper provides a pair of outer arms resiliently engageable with the outer surface of said coiled measuring blade.

4. The replacement cartridge of claim 3 wherein the spool is provided with side walls extending beyond the coiled measuring blade and said pair of outer arms snap over the edge of one of said side walls to retain the keeper on the spool.

5. The replacement cartridge of claim 1 wherein a noncircular central recess is provided in the end of said hub and a mating noncircular projection on said keeper is engaged in said recess to non-rotatably fix the keeper relatively to said hub.

6. In a measuring device of the coilable rule type having a casing comprising a pair of casing halves defining a chamber therein, a recoil spring received in the chamber and a coilable measuring blade connected to said spring to be retracted into coiled position in the chamber under the bias of said recoil spring and extended through an opening in said casing against the bias of said recoil spring; the improvement comprising a removable spool assembly incorporating a spool upon which said blade is coiled, and a hub member rotatably mounting said spool and to which the inner end of the recoil spring is secured for simultaneous removal and installation of said spool assembly, blade and spring in said casing, said casing and the ends of said hub member being provided with mating recess and projection means to mount said hub member in said casing and to fix said hub member against rotation relative to said casing under the bias of the recoil spring.

7. The device of claim 6 wherein the recess means is provided in the ends of said hub member and the projection means is a truncated stud centrally disposed on a wall of one of said casing halves.

8. The device of claim 7 wherein a truncated stud is provided on the confronting wall of each of said casing halves.

* * * * *